April 15, 1947.  E. HILL  2,418,933
NAVIGATIONAL CALCULATING INSTRUMENT
Filed Nov. 24, 1945  2 Sheets-Sheet 2
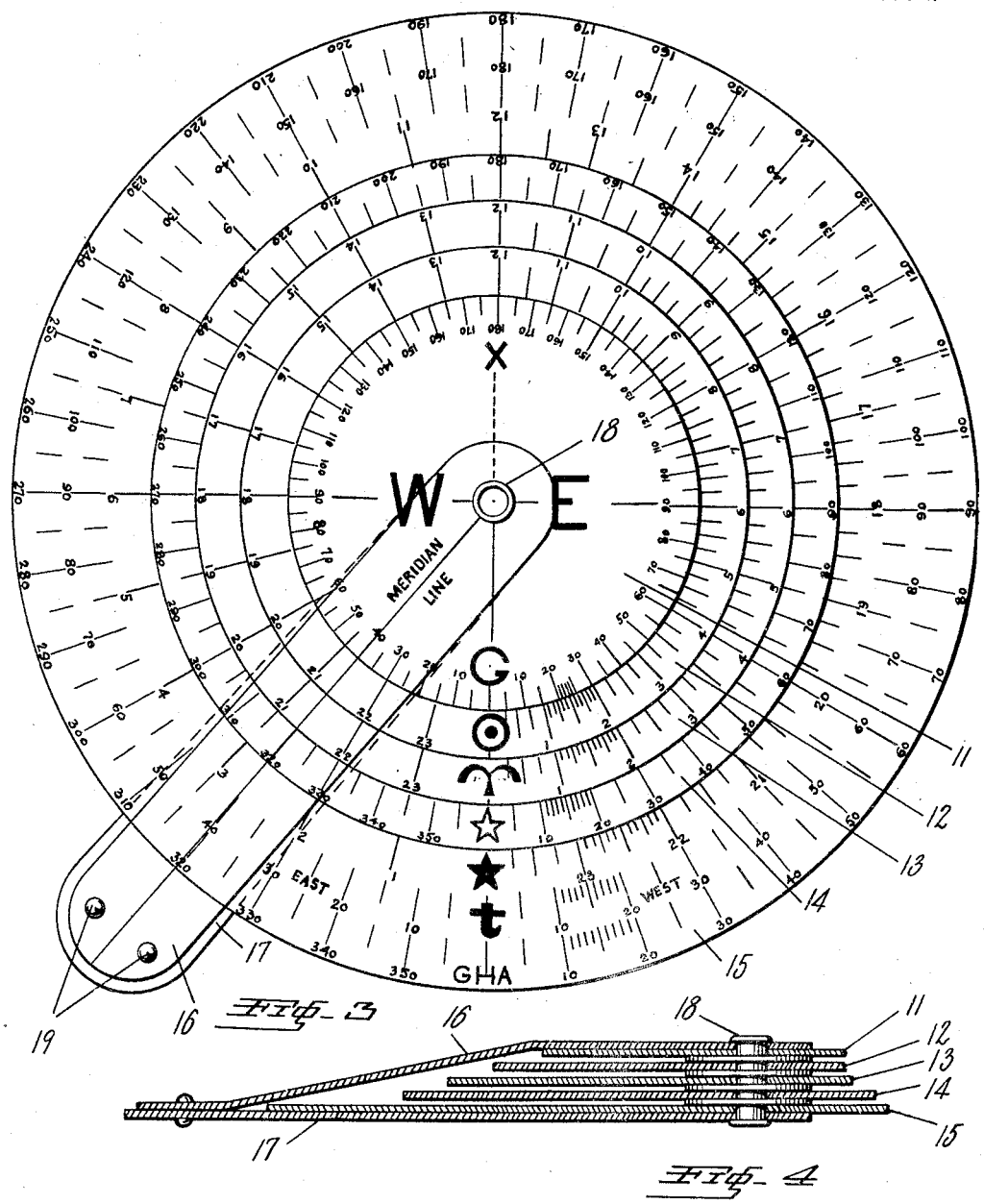
INVENTOR.
EBENEZER HILL
BY Charles J. Holland
ATTORNEY Patented Apr. 15, 1947

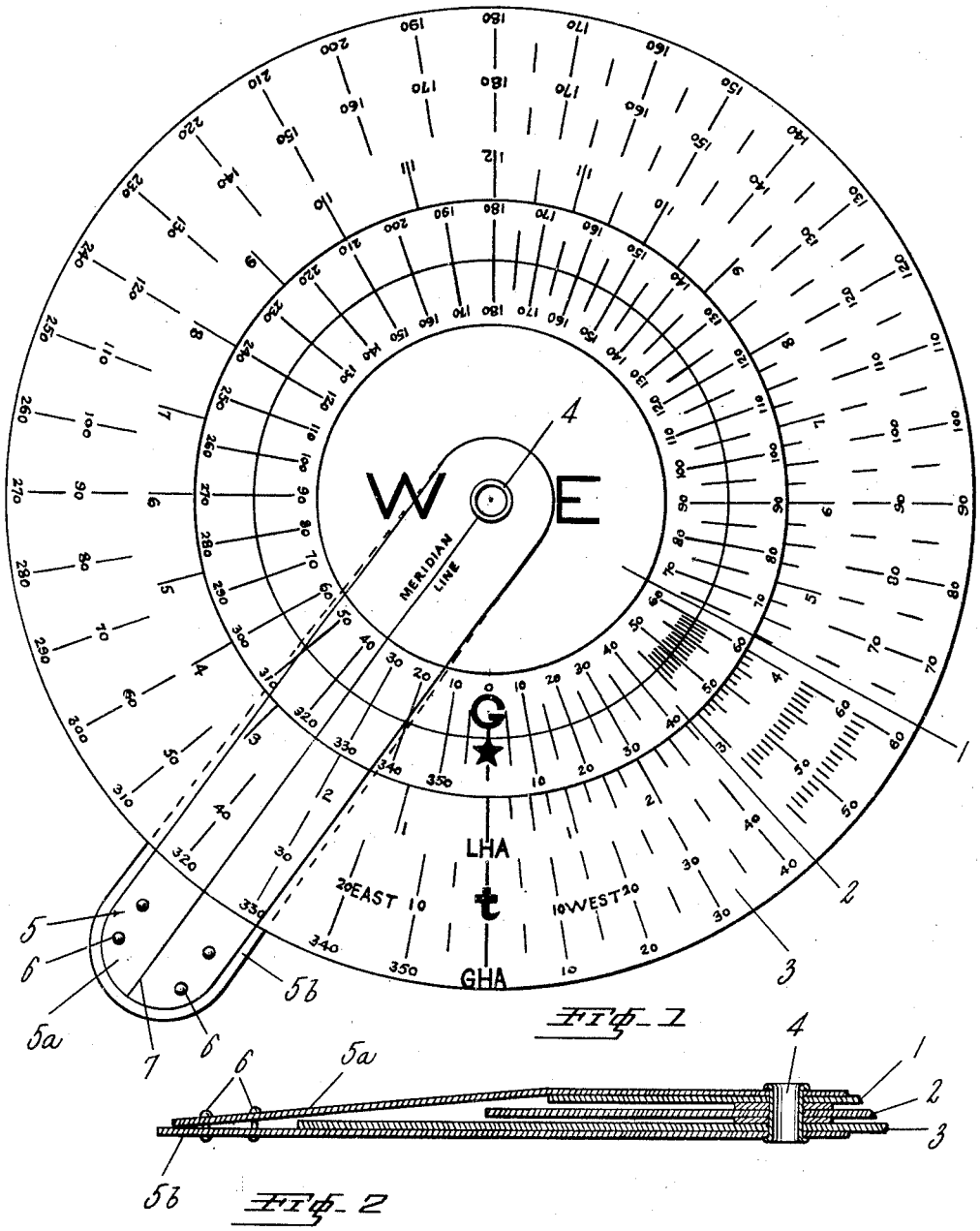

2,418,933

UNITED STATES PATENT OFFICE 2,418,933

NAVIGATIONAL CALCULATING
INSTRUMENT

Ebenezer Hill, Stamford, Conn.

Application November 24, 1945, Serial No. 630,617

3 Claims. (Cl. 235—78)

The present invention relates to calculating instruments and more particularly to a calculating instrument adapted to solve problems of importance in navigation.

In my Patent No. 2,404,709 issued July 23, 1946, of which the present application is a continuation-in-part, a calculating instrument is described and claimed by which various navigation problems can be calculated mechanically. By that instrument, if any one of the factors, such as date, time by chronometer, longitude, name of star, or hour angle of a star, or of any other body, is unknown and the other factors are known, the unknown factor can be calculated accurately and quickly.

Navigators either at sea or in the air depend either on the Nautical Almanac or the Air Almanac, for the data from which these computations are derived. The two almanacs, however, differ since the Nautical Almanac gives its data in terms of time and in arc which, however, is subject to many corrections, whereas the Air Almanac gives its data in terms of arc with all corrections having been made for every ten minutes of each day of the year.

The instrument of my said copending application is more suitable for use with the data derived from the Nautical Almanac than it is with the data derived from the Air Almanac, and, while it can be used with the latter, there is much more likelihood of confusion due to the necessity of converting from terms of arc to terms of time.

It is an object of the present invention to provide a calculating instrument of the general type disclosed in my said copending application but adapted for use specifically with the Air Almanac. However, with this device the same difficulty will present itself if it is employed with the Nautical Almanac, in which case it would be necessary to convert from terms of time to terms of arc.

Accordingly, it is a further object of the present invention to provide a combination instrument which is adaptable for use with either the Air Almanac or the Nautical Almanac and without the necessity of converting terms. For instance, the most important computation constantly used in navigation is the determination of the local hour angle of a star or the sun, moon or planet— that is, the hour angle of a particular body calculated from the particular meridian at which the ship or airplane may be at any given time. This hour angle is the angle expressed either in terms of arc or in terms of time between the meridian of longitude of a given place and the meridian through the given body which is used as a basis of reference. It is, in other words, the distance, either expressed in degrees and minutes, or in hours and minutes, of a selected body away from a given meridian at a given time. In navigation this quantity is referred to as "t." The final answer to the calculations is the same whether the Nautical or the Air Almanac is used.

In the device of my Patent No. 2,404,709, the determination of the hour angle is effected in hours and minutes and also in degrees and minutes; in the device of the present invention the answer is determined with equal facility and simultaneously both in terms of arc and in terms of time.

In the simpler form of the present invention the data employed is derived from the Air Almanac which, as previously stated, is expressed in terms of arc. The answer, however, is given both in terms of arc and in terms of time; in other words, there is an automatic conversion from terms of arc to terms of time in the result attained.

In the more complete form the data employed may be derived either from the Nautical Almanac or the Air Almanac and, regardless of which data is used, the result obtained by use of this instrument will be expressed simultaneously both in terms of arc and in terms of time.

The invention will be more fully understood from the drawings in which Fig. 1 is a form of the invention adapted for use with data derived from the Air Almanac; Fig. 2 is a fragmentary sectional elevation of Fig. 1 taken along the meridian line of the handle of Fig. 1; Fig. 3 is a form of the invention adapted for use either with data derived from the Nautical Almanac or data derived from the Air Almanac; and Fig. 4 is a fragmentary sectional elevation of Fig. 3 taken along the meridian line of the handle of that figure.

Referring now to Fig. 1, it will be seen that three disks are pivotally mounted so as to be rotatable relatively to each other. The top disk 1 is the longitude disk having degrees indicated on the margin thereof running from zero, indicated by the latter G, which stands for Greenwich, counterclockwise to 180 and clockwise to 180, indicating degrees of longitude east and west. The second or middle disk 2 represents the star hour angle. On this disk zero is indicated by a star symbol and it bears marginal graduations representing degrees from zero to 360 counterclockwise. The third or bottom disk 3 has three scales. The inner scale 3a adjacent to disk 2 is the local hour angle scale and is graduated from zero, indicated by L. H. A., to 12 clockwise, and counterclockwise east and west. This is a conversion scale from arc to time. The middle scale 3b on disk 3 is the "t" scale and is graduated in degrees from zero, indicated by the letter "t," to 180° clockwise and 180° counterclockwise east and west. The outer scale 3c of disk 3 is the Greenwich hour angle scale. This is graduated in degrees from zero, indicated by the letters G. H. A., to 360° counterclockwise. This letter scale can be used for reading the value of "t" when it is over 180° if desired in some calculations. The zeros of all three scales of this disk are in alignment.

As shown, the three disks are mounted concentrically and pivotally by the grommet 4 which also pivotally secures the handle 5. This handle is preferably made of transparent material and consists of an arm 5a which passes above the disks and arm 5b which goes underneath the disks, both being secured at the center by the grommet 4 and being united at the outer edges by the rivets 6. A meridian line 7 on the upper arm 5a extends radially over the disks from the central grommet 4 to the outer end of the handle 5.

There are many problems which can be determined by the instrument of the invention, a few of which are the following:

(1) To find the local hour angle of a star.
(2) To identify a star observed.
(3) To find the local hour angle of the sun or a planet or the moon.

In each of the above problems the operator of the instrument is assumed to be using the Air Almanac and deriving his data therefrom.

However, the form of the device shown in Fig. 3 may be used with either the Air Almanac or the Nautical Almanac.

Referring now to Fig. 3 it will be observed that there are five disks of progressively increasing diameters concentrically and pivotally mounted so that they rotate freely in relation to each other. The top disk 11 is the longitude disk and is marked with graduations from zero, indicated by the letter G, counterclockwise to 180° and also from zero G clockwise to 180°. At the 180° graduation a letter X or other symbol is placed. Next below the disk 11 is the sun disk 12 on which zero is indicated by the conventional sun symbol and graduations indicating time are placed thereon running counterclockwise from the zero (sun symbol) to 24. Below the sun disk 12 is the Aries disk 13 on which zero is marked by the Aries sign and the calibrations run counterclockwise from zero to 24. Next below the Aries disk is a star disk 14 on which are calibrations indicating degrees running from zero, indicated by the star, counterclockwise to 360°. As indicated, the star representing zero on disk 14 is shown as of a different color from the preceding disks. This star as well as the numerals indicating the calibrations and the scales themselves, for instance, may be red while the other disks may be printed in black.

The lowest disk, indicated by the numeral 15, has three scales, an inner scale on which zero is indicated by a star which, in view of the fact that the star symbol on disk 14 may be assumed to be red, will be black the same as disks 11, 12 and 13. The star scale on disk 15 represents the right ascension of a body and is marked with calibrations indicating hours and minutes running from zero indicated by the star clockwise to 24. A middle scale on disk 15 is marked with graduations indicating degrees running from zero, indicated by the letter "t," clockwise to 180° and also counterclockwise to 180°. Outside this scale and running around the margin of disk 15 is the Greenwich hour angle scale on which zero is indicated by the letters G. H. A. This scale carries markings indicating degrees running from zero (G. H. A.) to 360° counterclockwise and is marked in a distinguishing color such as red. On disk 15 the zeros of the three scales indicated by the black star, letter "t" and letters G. H. A., are in alignment.

A handle similar to the handle above described in relation to Fig. 1 extends radially from the pivotal grommet which binds the disks concentrically across the device. This handle has an upper arm 16 which carries a meridian line and extends above all the disks. A lower arm 17 extends underneath the disks, both being pivotally secured at the center of the device by the grommet 18 and at the outer end by the rivets 19.

When using the Nautical Almanac, disk 14 having the red star and red degree indications and the red outer scale G. H. A. are not used. The inner scale of disk 15 identified by the black star at zero is used as is scale marked "t" and also disks 11, 12 and 13.

When the Air Almanac is used, disk 11, the longitude disk, 14 the red star disk and disk 15 are used. On disk 15 the red G. H. A. scale, the "t" scale in black and the black star scale, convert the arc of "t" into time if desired.

To illustrate the use of the instrument shown in Fig. 3 when using data from the Nautical Almanac:

Calculate the local hour angle, "t," of any star or planet when the date, longitude and chronometer time and the name of star or planet are known. With the date and time by chronometer get the right ascension of the mean sun and also the right ascension of the star or planet from the Nautical Almanac.

(1) Place the "G" of the longitude disk, the top disk, on the chronometer time on the second disk, the sun disk.
(2) Rotate both disks, the longitude disk and the sun disk, together as one until the zero of the sun disk registers with the right ascension of the mean sun on the third disk, the Aries disk.
(3) Holding these three disks as one, put the meridian line of the handle on the right ascension of the star or planet, as given in the Nautical Almanac, on the inner scale of the lowest disk, the black star scale.
(4) Rotate the three top disks together as one until the sign of Aries is under the meridian line of the handle.
(5) Holding all disks in this position, rotate the handle until the meridian line registers with the longitude on the top disk.
(6) Read the local hour angle, "t," under the meridian line of the handle on the middle scale of the lowest disk.

This is in degrees east or west from your local meridian and is so marked. If an hourly conversion is desired, read the star scale (black), the inner scale of the lowest disk under the meridian line of the handle. If above 12 hours, subtract this value from 24 hours. This subtraction can be easily made on the instrument by holding the handle and four lower disks as one and rotating disk 11 until the G is under the meridian line of the handle, then holding all disks as one, rotate the handle until the meridian line registers with the symbol X at 180° from G. The hour or arc is then read directly under the meridian line on disk 15.

Calculate the local hour angle, "t," of the sun when the time and the date and the longitude are known.

With the date and the time by chronometer, get the right ascension of the mean sun from the Nautical Almanac.

(1) Place the point diametrically opposite "G" (180° marked "X") of the longitude disk 11 on the chronometer time on the sun disk 12.
(2) Hold as one disks 11 and 12 and place the sun symbol of the sun disk on the right ascension of the mean sun on the Aries disk 13.
(3) Hold as one disks 11, 12 and 13 and place the meridian line of the handle on the right ascension of the mean sun again on the star right ascension scale of the lowest disk 15, the black star scale.
(4) Rotate the three top disks 11, 12 and 13, together as one until the sign of Aries on disk 13 is under the meridian line of the handle.
(5) Holding all disks in this position, rotate the handle until the meridian line registers with the longitude on the top disk 11.
(6) Read the local hour angle, "t," under the meridian line of the handle on the middle scale of the lowest disk 15. This is in degrees east or west from your local meridian. If an hourly conversion is desired read the black star scale of the lowest disk 15 under the meridian line of the handle. If above 12 hours, subtract this from 24 hours in the manner above described.

To illustrate the use of the Air Almanac in solving these same two problems. The date, time of day and the name of the star are known. Using this data, get the Greenwich hour angle of Aries from the Air Almanac and also the sidereal hour angle of the star.

(1) Put the meridian line of the handle on the G. H. A. Aries on the outer (red) scale of the lowest disk 15.
(2) Put the star symbol of the star disk 14, the red star scale, under the meridian line of the handle.
(3) Put the meridian line of the handle on the S. H. A. of the star on the red star disk 14.
(4) Put the "G" of the longitude disk 11 under the meridian line of the handle.
(5) Hold all disks firmly and rotate the handle until the meridian line registers with the local longitude on the top disk 11.
(6) Read the middle scale "t" of the lowest disk 15 under the meridian line of the handle. This is the local hour angle of the star in degrees east or west of your local meridian. If conversion to hours is desired, read the black star scale of the inner scale of this lowest disk 15. If this is over 12 hours, subtract it from 24 hours in the manner above described.

To find the local hour angle of the sun or planet or the moon. The date and the time of day and the longitude are known. Get from the Air Almanac the Greenwich hour angle of the sun or the planet or the moon for the date and time of day.

(1) Put the meridian line of the handle on the sun G. H. A. on the outer scale of the lowest disk 15, the red scale. Or, in the case of a planet or the moon, use the G. H. A. of that body as shown in the Air Almanac.
(2) Put the "G" of the longitude disk 11 under the meridian line of the handle.
(3) Rotate the handle until the meridian line registers with the longitude on the top disk 11.
(4) Read the middle scale "t" of the lowest disk 15 under the meridian line of the handle for local hour angle of the sun or other body. The inner scale on disk 5 converts this into time but if over 12 hours, subtract it from 24 hours as above described. The scale "t" shows whether the hour angle is east or west from your meridian.

From the foregoing examples the difference in operation when using the Nautical Almanac and the Air Almanac will be seen. With the data from the Nautical and Air Almanacs we arrive at the same result for the local hour angle must be the same no matter which method we use. Other problems are worked in much the same way. All of these on the same instrument, that is, the one shown in the Fig. 3 with the five disks.

Having thus described my invention, what I claim is:

1. A navigational calculating instrument comprising five superposed disks of diameters progressively increasing from top to bottom, mounted rotatably in relation to each other on a rotatable handle on a common center; said topmost disk being provided with graduations indicating 180° of longitude east and west; said second and third disk being provided with graduations indicating hours and minutes from zero to 24 counterclockwise; said fourth disk being provided with graduations indicating degrees of arc from zero to 360° counterclockwise; and said fifth disk being provided with three concentric scales having their zero points in alignment, said inmost scale having graduations indicating hours and minutes from zero to 24 clockwise, said middle scale having graduations indicating degrees from zero to 180° clockwise and from zero to 180° counterclockwise and said outermost scale having graduations indicating degrees of arc from zero to 360° counterclockwise; and a meridian line radially disposed across said disks on said handle and rotatable in relation to said disks.

2. A navigational calculating instrument comprising a plurality of rotating disks centrally pivoted and superposed and of progressively increasing diameters and a rotatable handle also pivoted at the common center of said disks, said handle bearing a meridian line extending radially over said disks; scales arranged circularly on said disks indicating the necessary factors for calculating navigational problems including 180 degrees of longitude east and west, time by chronometer encompassing twenty-four hours counterclockwise, right ascension of the mean sun encompassing twenty-four hours counterclockwise, right ascension of a star, planet or moon encompassing twenty-four hours clockwise, meridian angle scale indicating 180 degrees of arc east and west, Greenwich hour angle scale in degrees of arc counterclockwise, and sidereal hour angle scale in degrees of arc counterclockwise.

3. A navigational calculating instrument comprising three superposed disks centrally pivoted and of progressively increasing diameters from top to bottom rotatable about the common center; said disks bearing graduations disposed circularly thereon and indicating navigational indicia including degrees of longitude east and west, degrees of arc from zero to 360° in counterclockwise direction, calibrations in terms of time encompassing twenty-four hours, degrees of arc 180° clockwise and 180° counterclockwise and degrees of arc from zero to 360° counterclockwise; and a rotatable meridian line on a handle pivoted centrally of said disks and extending radially across said disks.

EBENEZER HILL.

REFERENCES CITED

The following references are of record in the file of this patent:

UNITED STATES PATENTS

| Number | Name | Date |
|---|---|---|
| 1,145,020 | Hill | July 6, 1915 |
| 1,207,439 | Picolet | Dec. 5, 1916 |
| 2,394,226 | Boldocchi | Feb. 5, 1946 |
| 2,404,709 | Hill | July 23, 1946 |